United States Patent

Cochran et al.

[15] 3,691,864

[45] Sept. 19, 1972

[54] X-Y ROTATIONAL POSITIONING SYSTEM

[72] Inventors: Thomas J. Cochran, La Grangeville; Herbert K. Hazel; William G. Rance, Jr., both of Poughkeepsie, all of N.Y.

[73] Assignee: International Business Machines Corporation, Armonk, N.Y.

[22] Filed: Nov. 19, 1970

[21] Appl. No.: 90,929

[52] U.S. Cl.........................74/479, 29/203 B, 33/1 M

[51] Int. Cl.............................................G05g 15/06

[58] Field of Search...74/479, 471 XY, 675; 33/1 M, 33/180 R; 244/79, 1 SA; 29/407, 203 B

[56] References Cited

UNITED STATES PATENTS

| | | | |
|---|---|---|---|
| 2,066,949 | 1/1937 | Ruiz | 33/1 M |
| 3,395,589 | 8/1968 | Gerstein | 74/471 |

*Primary Examiner*—Milton Kaufman
*Assistant Examiner*—F. D. Shoemaker
*Attorney*—Hanifin and Jancin and William S. Robertson

[57] ABSTRACT

An improved system is provided for positioning a circuit board with respect to wire handling and bonding apparatus. The board is movable in an X-Y plane, can be raised or lowered along a Z dimension axis, and can be rotated about the Z dimension axis. Separate X, Y, Z, and rotational dimension electric motors are mounted on a stationary base. A differential mechanism couples an X positioning mechanism to respond to the difference between the X dimension motor position and the rotational dimension motor position. The differential mechanism prevents changes in the rotational position of the X positioning mechanism from affecting the X dimension position. A similar differential mechanism couples the Y positioning mechanism to the Y drive motor and to the rotational dimension drive motor.

5 Claims, 3 Drawing Figures

INVENTORS
THOMAS J. COCHRAN
HERBERT K. HAZEL
WILLIAM G. RANCE JR

BY W. Robertson
ATTORNEY

X-Y ROTATIONAL POSITIONING SYSTEM

INTRODUCTION

For bonding wires to a circuit board, it is desirable to move the circuit board in a horizontal plane under the bonding apparatus, to raise and lower the board, and to rotate the board about a vertical (Z dimension) axis. Positioning mechanisms of this general type are well known. An X-Y positioning system comprises a carrier for the circuit board and a pair of screws and related supporting components that move the carrier in the X or Y dimensions as the screws are turned. One screw is driven by an X dimension electric motor and the other is driven by a Y dimension electric motor. The X and Y motors are controlled through a predetermined sequence according to a program that is stored in a data processing system. The motors may be coupled directly to the screws so that a desired X or Y position corresponds in direct ratio to the position of the X or Y drive motor. An object of this invention is to provide this advantage in a new and improved positioning system.

A rotational dimension can be provided by mounting an X-Y positioning mechanism on a rotatable table. The table is driven from a rotational dimension drive motor, and the program is adapted to control the X, Y, and rotational drive motors. In the known prior art, the X and Y drive motors have been mounted on the rotatable table and have preserved the advantageous direct relationship between the motor position and the resulting positioning mechanism position. Unfortunately, such an arrangement requires transmitting electrical signals to the movable motors. One object of this invention is to provide a new and improved positioning system in which the X, Y, and rotational drive motors are mounted on a common stationary base.

A stationary X motor which is coupled to a rotatable X position mechanism positions the drive screw with respect to the table, just as it would if the motor were mounted on the table with the mechanism. Conversely, rotation of the table with respect to the X drive motor would similarly produce a change in the X position; rotation of the table with respect to the X motor is just the reverse of rotating the X motor with respect to the table. (This problem will be more readily understandable from the description of the preferred positioning system of the drawing.) Thus, in the hypothetical positioning mechanism being described, the goal of mounting the motors on a common stationary base conflicts with the goal of maintaining the X, Y, and rotational dimension signals independent of each other in the control program. An object of this invention is to provide a new and improved positioning system in which the drive motors are mounted on a common stationary base and the position of each drive motor is directly related to the position in the associated dimension.

The preferred positioning mechanism includes a Z dimension drive which raises or lowers the circuit board with respect to the X and Y position mechanisms. The Z dimension mechanism does not present the problems just described, but it illustrates a more general application of the invention.

THE INVENTION

The invention can be most easily understood as it is applied to a positioning system having only a rotational dimension and an X dimension. The X dimension mechanism is mounted on a rotatable table that is driven directly from a rotational dimension motor. A rotatable shaft positioned along the axis of rotation provides an input to the X dimension positioning mechanism. Thus, the relationship between the shaft position and the X dimension position is a complex function of both the rotational position of the table and the desired position in the X dimension, as has already been explained. A differential gear mechanism couples the shaft to be driven according to the difference between the rotational dimension motor and an X dimension motor. The differential mechanism is arranged so that when the rotational dimension motor is stationary, an input from the X dimension motor is transmitted directly to the X positioning mechanism. Thus, with the rotational dimension motor stationary, the system operates like the systems just described which do not have a rotational positioning mechanism. When the X motor is stationary and the rotational dimension motor turns, the differential mechanism turns the X dimension input shaft in step with the rotatable table and thereby preserves the original relationship between the rotatable shaft and the rotatable table. Thus, the X motor is programmed and operated according to the desired X position without regard to the operation of the rotational dimension motor. Both motors can of course be operated at the same time in the way that has been explained for separate operations.

In the preferred embodiment, a conventional differential gear couples the X input shaft to the rotational dimension motor and to the X dimension motor. Equivalent mechanical devices are well known. A similar differential gear couples a Y input shaft to the rotational drive motor and to a Y dimension motor.

THE DRAWING

THE PREFERRED POSITIONING SYSTEM

Figure 2:
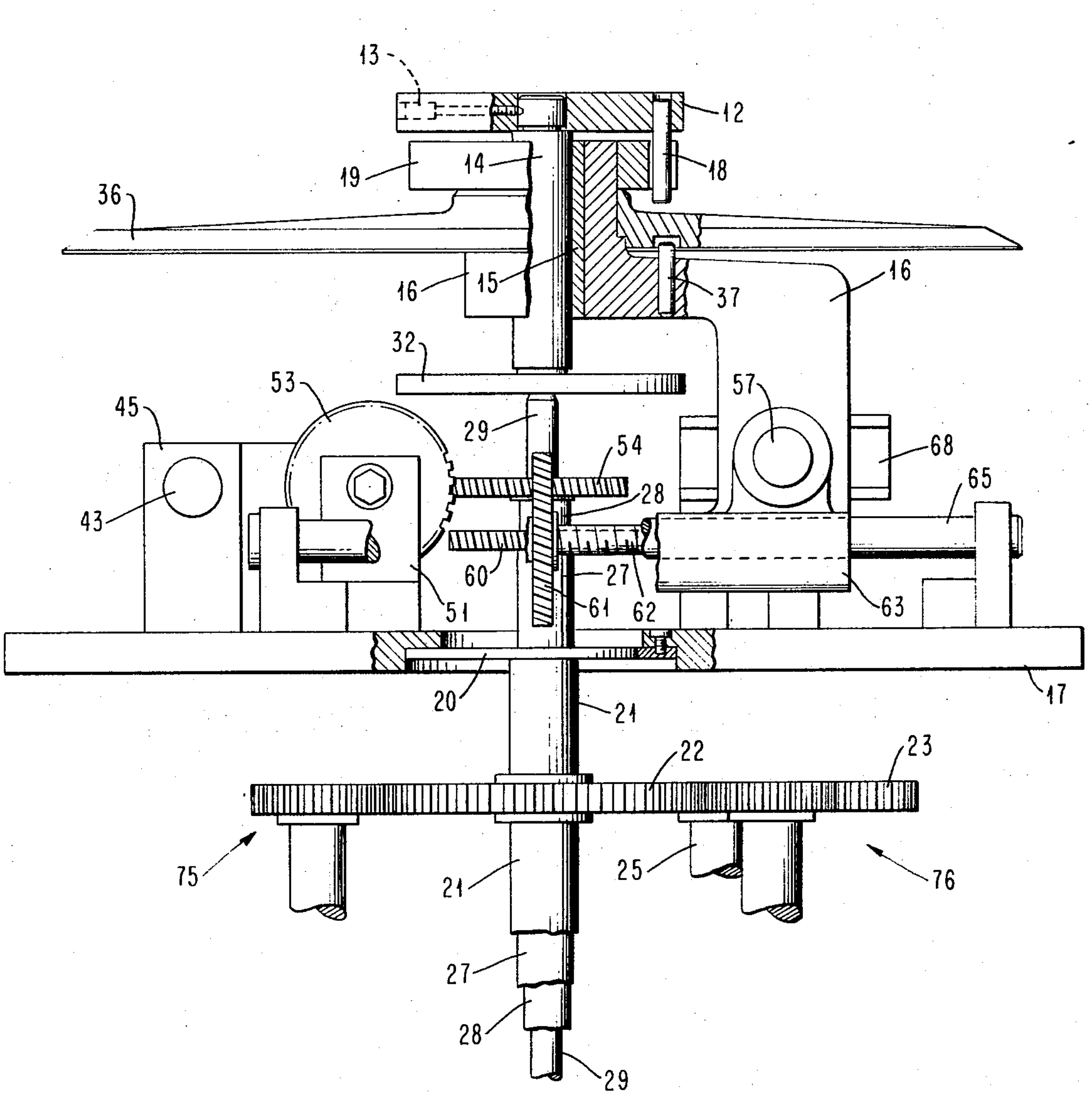
FIG. 2 is a side view of the positioning mechanism and the coupling to the components of FIG. 1.

The Positioning Mechanism of FIG. 2

The general features of the positioning mechanism are shown in FIG. 2. A carrier 12 for the subject to be positioned (not shown) is mounted by means of a screw 13 on a downwardly extending shaft 14. Shaft 14 is mounted to slide vertically in a bearing 15 of a part 16 that is coupled to a rotatable table 17 by means of an X–Y positioning mechanism (described later). A pin 18 fixed to carrier 12 and slidable in a collar 19 attached to part 16 couples carrier 12 to rotate with part 16 and to move vertically independently of part 16. Table 17 is fastened to a hub 20 of a shaft 21. Gears 22 and 23 couple shaft 21 to be driven from the shaft 25 of a rotational motor (not shown). Thus, in response to an electrical input to the rotational motor, table 17 and the components that have been described so far rotate about the axis of shaft 21.

Figure 3:
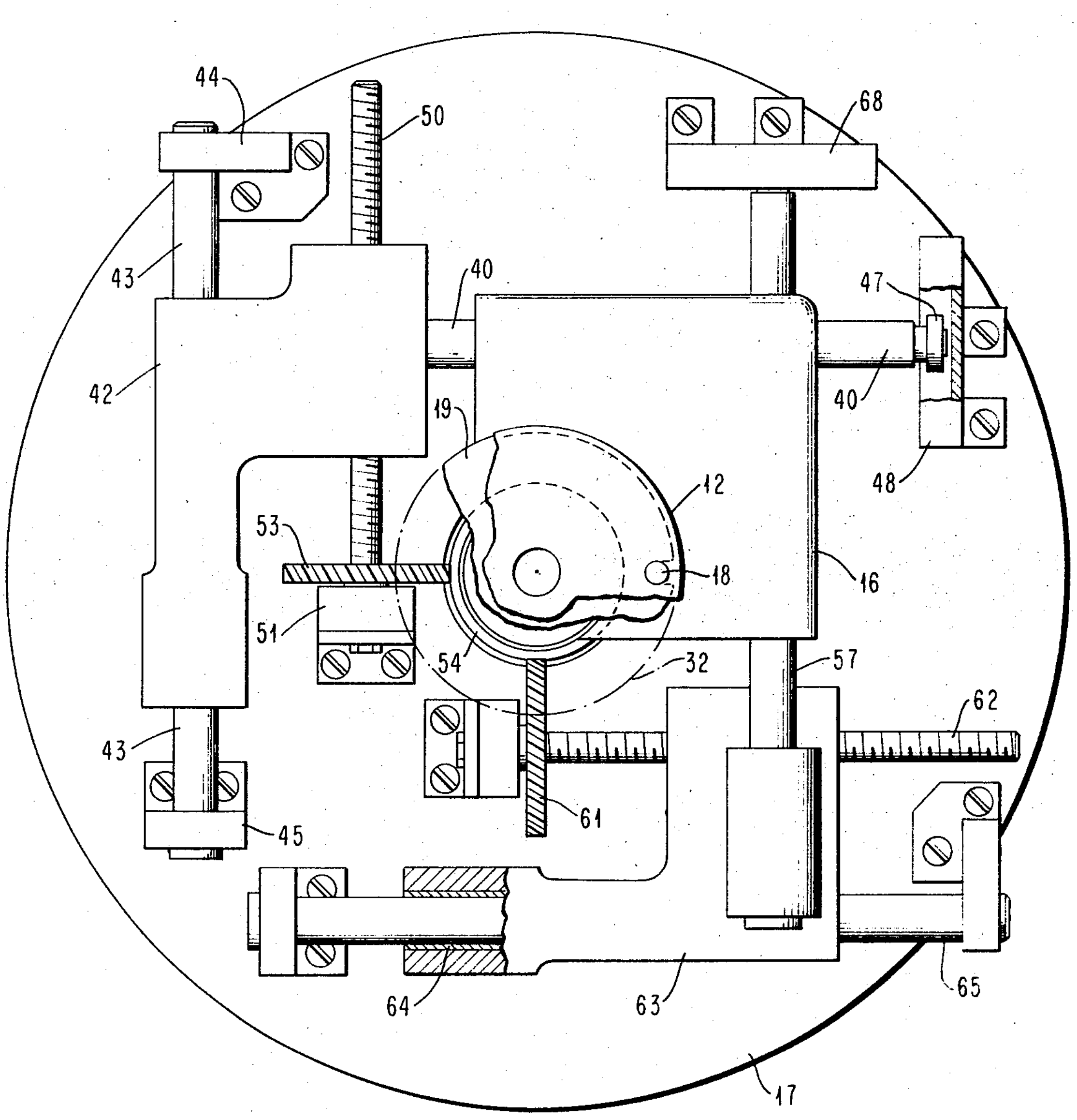
FIG. 3 is a top view of the positioning mechanism of FIG. 2.

Shaft 21 is axially hollow and contains coaxial shafts 27, 28 and 29. Shafts 27 and 28 are coupled at their upper ends to the X and Y positioning mechanism. Shaft 29 is movable vertically and is coupled to shaft 14 by means of a plate 32. Plate 32 is fixed to shaft 14 and slidable on the upper surface of shaft 29 to couple shafts 29 and 14 and to otherwise permit motion of shaft 14 with respect to shaft 29. FIG. 2 also shows some of the components of the X–Y positioning mechanism which will be described later as they are shown in FIG. 3. In addition, FIG. 2 shows a cover 36 that is mounted by means of a pin 37 to move with part 16. Cover 36 makes a sliding seal with the upper surface of side walls of an enclosure that is not shown.

The Positioning Mechanism of FIG. 3

The table 17 and parts 16 which were introduced in the description of FIG. 2 are shown in FIG. 3. In addition, FIG. 3 shows the support 12 for the subject to be positioned and other components that are located about the axis of shaft 21. Table 17 is rotatable about the axis of shaft 21 but is laterally stationary in the plate of FIG. 3. Part 16 is movable laterally on table 17 and also rotates with table 17. In the rotational position in which the drawing shows the apparatus, the X dimension of a subject to be positioned is from side to side in the drawing and the Y dimension is from top to bottom in the drawing, as is conventional. More generally, the X and Y dimensions refer to coordinates of the subject to be positioned and they rotate with table 17.

Part 16 is slidable in the X dimension on a shaft 40. Shaft 40 has its left hand end fixed to a part 42 which is slidable in the Y dimension on a shaft 43. Shaft 43 is mounted on table 17 by means of brackets 44 and 45. A roller 47 is mounted on the right hand end of shaft 40 and supports shaft 40 in a track 48. Thus, as the apparatus has been described so far, shaft 40 is movable in the Y dimension and it carries part 16 to the corresponding position. A screw 50 is rotatably mounted in a support 51 and is threaded in part 42. It is driven from shaft 28 through gears 53 and 54; rotation of shaft 28 moves part 16 in the Y dimension. A shaft 57, a component of the X dimension drive that corresponds to shaft 40, helps to support part 16 for motion in the Y dimension.

Shaft 57 which has already been introduced and the other components of the X dimension positioning mechanism are generally similar to the Y dimension components just described. FIG. 2 shows a gear 60 mounted on shaft 27 and both FIGS. 2 and 3 show the associated gear 61 that drives the X dimension positioning screw 62. Part 63 which corresponds to part 42 is broken away to show a bearing 64 for the X dimension guide shaft 65. The X dimension track 68 is shown in FIG. 2 in a different view from the corresponding Y dimension track 48 of FIG. 3.

Figure 1:
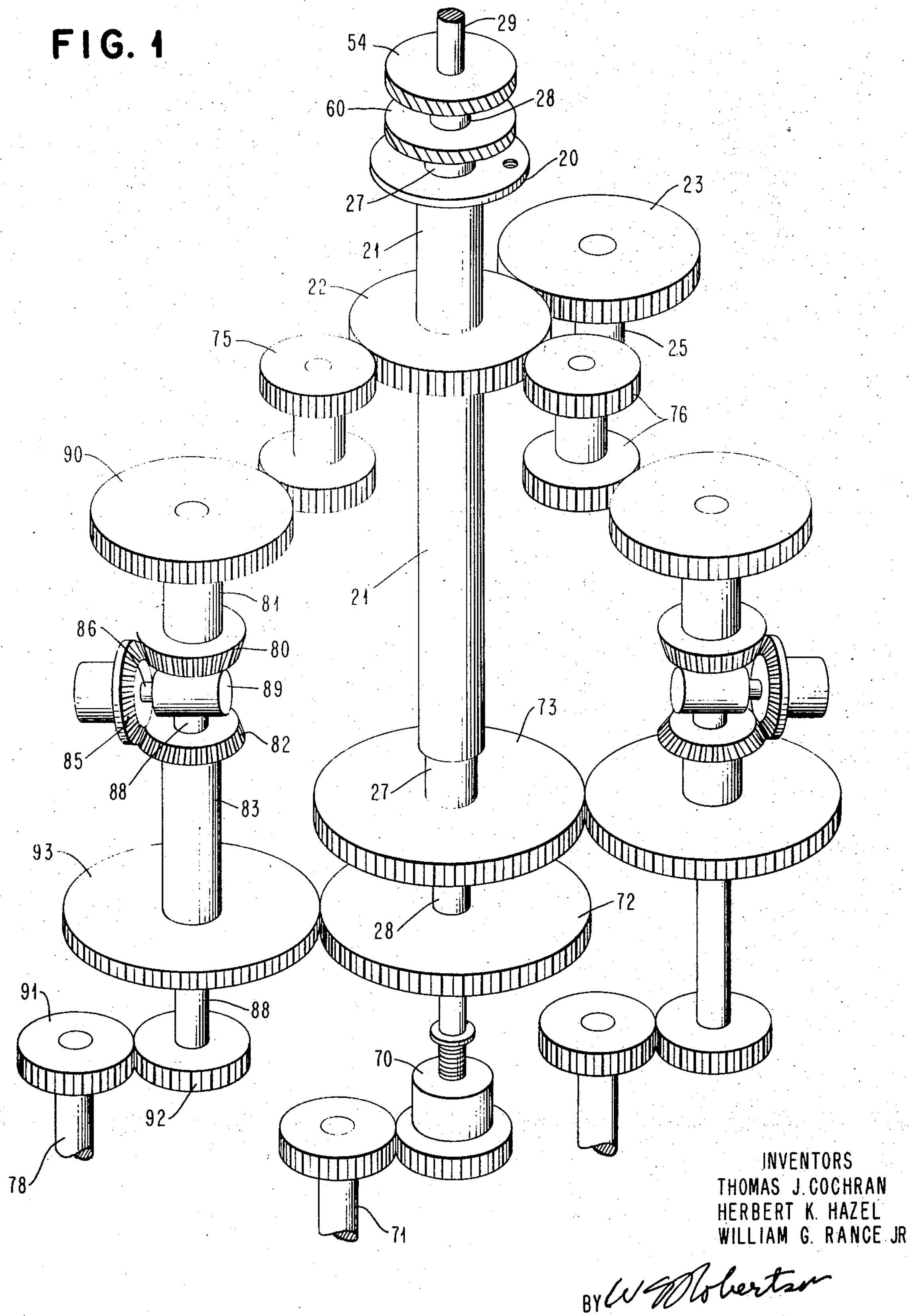
FIG. 1 shows the differential gears and other components for coupling motors to the X–Y and rotational positioning mechanism of the positioning system of this invention.

The Apparatus of FIG. 1

The components in the upper most part of FIG. 1 will be recognized from the description so far. The Z dimension shaft 29 extends from the upper part of the drawing to the lower most part of the drawing where it is connected to a screw mechanism 70 that is driven from a motor shaft 71. The Y positioning mechanism shaft 28, which is connected at its upper end to gear 54 extends downwardly to a gear 72. Similarly, the X dimension shaft 27 extends downwardly to a gear 73. The hub 20, shaft 21, gears 22 and 23 and the motor shaft 25 of the rotational drive are also shown in FIG. 2. An idler gear pair 75 couples the rotational motor shaft 25 to provide an input to a Y dimension differential gear (described later). An idler gear pair 76 provides a similar input to an X dimension differential gear.

A Y dimension motor shaft 78 is coupled to the Y dimension gear 72 through a differential mechanism. With this arrangement, the motion of the Y dimension motor is controlled without regard to the motion of the rotational motor.

The differential gear is conventional and includes a first gear 80 that rotates about the axis of a shaft 81, a second gear 82 that is connected to rotate about the axis of a shaft 83 which is coaxial with shaft 81, and a gear 85 that engages gears 80 and 82 and rotates differentially, according to the relative speeds and directions of gears 80 and 82, about a shaft 86 that is offset from shafts 81 and 83 or in an orbital fashion about the axis of a shaft 88. A part 89 connects shaft 86 and shaft 88.

A gear 90 couples shaft 81 to idler gear pair 75 so that shaft 81 provides the rotational motor input to the differential. Two gears 91 and 92 couple shaft 88 to the Y motor so that the Y motor input to the differential produces an orbital motion of gear 85. Gear 82 provides the output of the differential and is coupled through its shaft 83 and a gear 93 to the gear 72 of the Y positioning mechanism. The differential gear for the X positioning mechanism can be readily understood from the drawing and from the preceding description of the Y positioning mechanism.

Operation

When the rotational motor is stationary, differential input shaft 81 and gear 80 are held stationary. Thus, when the Y dimension motor is energized, shaft 88 turns and moves gear 85 in an orbital path about shaft 88. Gear 85 also rotates about its shaft 86 and thereby turns the differential output gear 82. Thus, when only the Y motor is energized, the Y positioning mechanism shaft 28 is turned in a direct relationship to the Y motor.

It will be helpful to consider a hypothetical operation in which the rotational motor turns table 17 but is disconnected from the Y dimension differential gear so that Y positioning mechanism shaft 28 remains stationary. As FIG. 3 shows, when table 17 turns about stationary gear 54, gear 53 and screw 50 turn (just as turning gear 54 with respect to table 17 causes gear 53 to turn). The X dimension gears would similarly turn so that the subject would undesirably move diagonally in response to rotation of the table in this hypothetical operation. The differential mechanism causes the shafts 27 and 28 to rotate with the table in response to an input from the rotational motor.

When the Y motor is stationary, the rotational input to the differential turns shaft 28 in step with shaft 21 and table 17 to maintain gears 53 and 54 relatively stationary. For example, when shaft 25 of the rotational motor turns clockwise, shaft 21 and table 17 turn counter clockwise according to the ratio of gears 22 and 23. Gears 75 turn clockwise and the upper differential gears 90 and 80 turn counter clockwise. Since shaft 88 is held stationary by the Y motor, gear 85 rotates with its shaft 86 in a fixed orbital position. Thus, gears 82 and 93 turn clockwise and gear 72 and shaft 28 turn counter clockwise with table 17.

When the rotational motor and Y motor turn at the same time, one component of the rotation of shaft 28 matches the rotation of table 17 and the remaining component corresponds to the motion of the Y motor.

Other Embodiments

The description of the invention in the specific application for positioning a circuit board with respect to a wire handling and bonding apparatus will suggest various applications for the invention for positioning various subjects within various environments. A planetary gear is a known equivalent of the differential gears that are specifically shown in the drawing. Those skilled in the art will recognize various other applications for the invention and suitable modifications within the spirit of the invention and the scope of the claims.

What is claimed is:

1. A system for positioning a subject in an X dimension and for rotating said subject about a Z dimension axis, comprising:

a table mounted to rotate about said axis and first means for turning said table to a selected rotational position, a first rotatable shaft extending along said axis and means mounted on said table and responsive to the rotation of said shaft with respect to said table for positioning said subject in the X dimension, second means rotatable according to a desired position in said X dimension, and means connected to rotate said shaft according to the difference between an input from said first means and an input from said second means, whereby said X dimension positioning means is operated according to the position of said second means independently of the rotational position of said table.

2. The system of claim 1 wherein:

said first means comprises an electric motor responsive to a first signal to turn said table to a selected position corresponding to said signal, and said second means comprises an electric motor rotatable in response to a second signal representing said desired position in the X dimension.

3. The system of claim 2 wherein said means connected comprises:

a first gear and a second gear mounted on separate, coaxial, shafts, a third gear coupled to said first and second gears and means mounting said third gear to rotate differentially, according to the relative speeds and directions of said first and second gears, about an axis offset from the axis of said first and second gears or to rotate orbitally about said axis of said first and second gears, means connecting said first gear to be turned by said first motor, means connecting said second motor to drive said means mounting said third gear to produce orbital motion, and means connecting said second gear to turn said first rotatable shaft.

4. The system of claim 3 wherein the axis of said third gear is orthogonal to the axis of said first and second gears.

5. The system of claim 3 further including:

a second rotatable shaft extending along said Z dimension axis and means mounted on said table and responsive to the rotation of said second shaft with respect to said table for positioning said subject in the Y dimension, a third electric motor rotatable in response to a third signal representing a desired Y position, a fourth and a fifth gear mounted on separate coaxial shafts and a sixth gear coupled to said fourth and fifth gears and means mounting said sixth gear to rotate differentially according to the relative speeds and directions of said fourth and fifth gears about an axis orthogonal to the axis of said fourth and fifth gears or to rotate orbitally about said axis of said fourth and fifth gears, means connecting said fourth gear to be turned by said first motor as said table is rotated about said axis, means connecting said third motor to drive said means mounting said sixth gear to produce orbital motion, and means connecting said fifth gear to turn said second rotatable shaft.

* * * * *